(12) United States Patent
Ebiyama

(10) Patent No.: US 10,095,737 B2
(45) Date of Patent: Oct. 9, 2018

(54) INFORMATION STORAGE SYSTEM

(71) Applicant: NEC Corporation, Tokyo (JP)

(72) Inventor: Tomoo Ebiyama, Tokyo (JP)

(73) Assignee: NEC Corporation, Tokyo (JP)

( * ) Notice: Subject to any disclaimer, the term of this patent is extended or adjusted under 35 U.S.C. 154(b) by 562 days.

(21) Appl. No.: 14/660,055

(22) Filed: Mar. 17, 2015

(65) Prior Publication Data

US 2015/0269171 A1    Sep. 24, 2015

(30) Foreign Application Priority Data

Mar. 20, 2014    (JP) ................. 2014-057521

(51) Int. Cl.
*G06F 17/30*    (2006.01)

(52) U.S. Cl.
CPC .............. *G06F 17/30433* (2013.01)

(58) Field of Classification Search
CPC ..................... G06F 17/30076; G06F 17/30433
See application file for complete search history.

(56) References Cited

U.S. PATENT DOCUMENTS

2012/0221586 A1*  8/2012  Kawata ............ G05B 19/41875
                                                        707/756
2013/0275391 A1*  10/2013 Batwara ............ G06F 17/30085
                                                        707/689

FOREIGN PATENT DOCUMENTS

| JP | H09-160817 A | 6/1997 |
| JP | 2006-003996 A | 1/2006 |
| WO | WO-2012/121316 A1 | 9/2012 |
| WO | WO-2013/018808 A1 | 2/2013 |
| WO | WO-2013/118270 | 8/2013 |

OTHER PUBLICATIONS

Japanese Office Action issued by the Japan Patent Office for Japanese Application No. 2014-057521 dated Nov. 28, 2017 (9 pages).

* cited by examiner

*Primary Examiner* — Dinku Gebresenbet
(74) *Attorney, Agent, or Firm* — Wilmer Cutler Pickering Hale and Dorr LLP

(57) ABSTRACT

An information storage system includes: a data storing unit storing key value data in which a key is one of a plurality of elements of record data composed of the elements and the key is associated with a value including one or a plurality of record data; and a data structure converting unit converting a data structure of the key value data stored by the data storing unit into another data structure by changing the key. The data structure converting unit performs conversion of the data structure of the key value data stored by the data storing unit in accordance with a use condition of the key value data.

7 Claims, 12 Drawing Sheets

Fig.2

·TABULAR DATA

| PRODUCT ID (PK) | PRODUCT NAME | PRODUCT CATEGORY | STOCK | PRICE |
|---|---|---|---|---|
| i1 | PRODUCT A | PERSONAL COMPUTER | 10 | 120,000 |
| i2 | PRODUCT B | PERSONAL COMPUTER | 3 | 100,000 |
| i3 | PRODUCT C | SMARTPHONE | 5 | 35,000 |
| i4 | PRODUCT D | TABLET | 8 | 50,000 |
| i5 | PRODUCT E | SMARTPHONE | 15 | 25,000 |

Fig.3

·FLAT-STRUCTURED KV DATA

| key | value |
|---|---|
| i1 | {i1, PRODUCT A, PERSONAL COMPUTER, 10, 120,000} |
| i2 | {i2, PRODUCT B, PERSONAL COMPUTER, 3, 100,000} |
| i3 | {i3, PRODUCT C, SMARTPHONE, 5, 35,000} |
| i4 | {i4, PRODUCT D, TABLET, 8, 50,000} |
| i5 | {i5, PRODUCT E, SMARTPHONE, 15, 25,000} |

Fig.4

・CLUSTER-STRUCTURED KV DATA

| key | value |
|---|---|
| PERSONAL COMPUTER | [i1, PRODUCT A, PERSONAL COMPUTER, 10, 120,000], [i2, PRODUCT B, PERSONAL COMPUTER, 3, 100,000] |
| SMARTPHONE | [i3, PRODUCT C, SMARTPHONE, 5, 35,000], [i5, PRODUCT E, SMARTPHONE, 15, 25,000] |
| TABLET | [i4, PRODUCT D, TABLET, 8, 50,000] |

Fig.5

・INDEX (A)

| key | value |
|---|---|
| PERSONAL COMPUTER | {i1, i2} |
| SMARTPHONE | {i3, i5} |
| TABLET | {i4} |

(B)

| key | value |
|---|---|
| PRODUCT A | {i1} |
| PRODUCT B | {i2} |
| PRODUCT C | {i3} |
| PRODUCT D | {i4} |
| PRODUCT E | {i5} |

(C)

| key | value |
|---|---|
| PRODUCT A | {PERSONAL COMPUTER} |
| PRODUCT B | {PERSONAL COMPUTER} |
| PRODUCT C | {SMARTPHONE} |
| PRODUCT D | {TABLET} |
| PRODUCT E | {SMARTPHONE} |

Fig.6

・STATISTICAL INFORMATION

| TABLE | ACCESSED TIME | SEARCHED COLUMN | ACCESSED KV NUMBER | PROCESSED RECORD NUMBER | NOT-PROCESSED RECORD NUMBER |
|---|---|---|---|---|---|
| TABLE A | 2013/11/28 10:01 | PRODUCT ID | 1 | 1 | 0 |
| TABLE B | 2013/11/28 10:02 | USER NAME | 1 | 30 | 0 |
| TABLE A | 2013/11/28 10:03 | PRODUCT CATEGORY | 121 | 120 | 0 |
| TABLE C | 2013/11/28 10:04 | ORDER ID | 1 | 1 | 180 |
| TABLE B | 2013/11/28 10:05 | USER NAME | 1 | 20 | 0 |
| TABLE C | 2013/11/28 10:06 | ORDER ID | 1 | 1 | 200 |
| TABLE A | 2013/11/28 10:07 | PRODUCT CATEGORY | 151 | 150 | 0 |

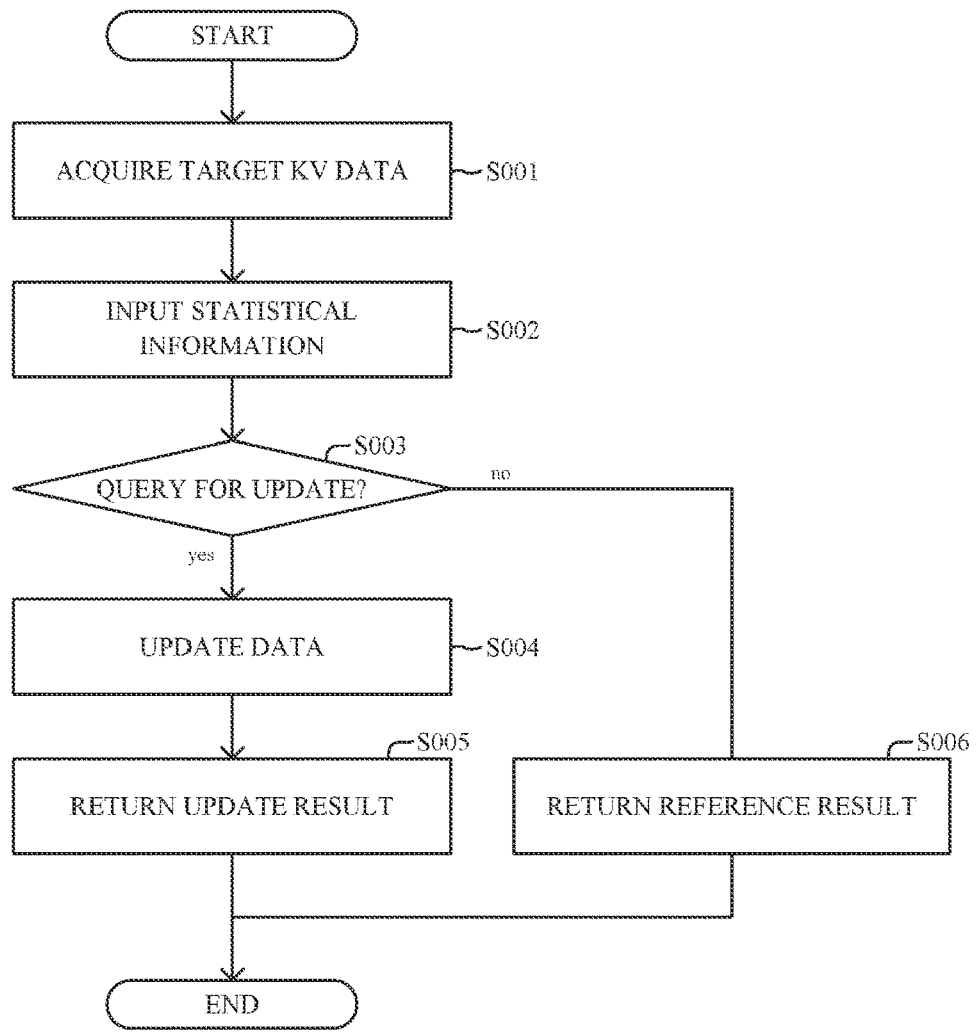

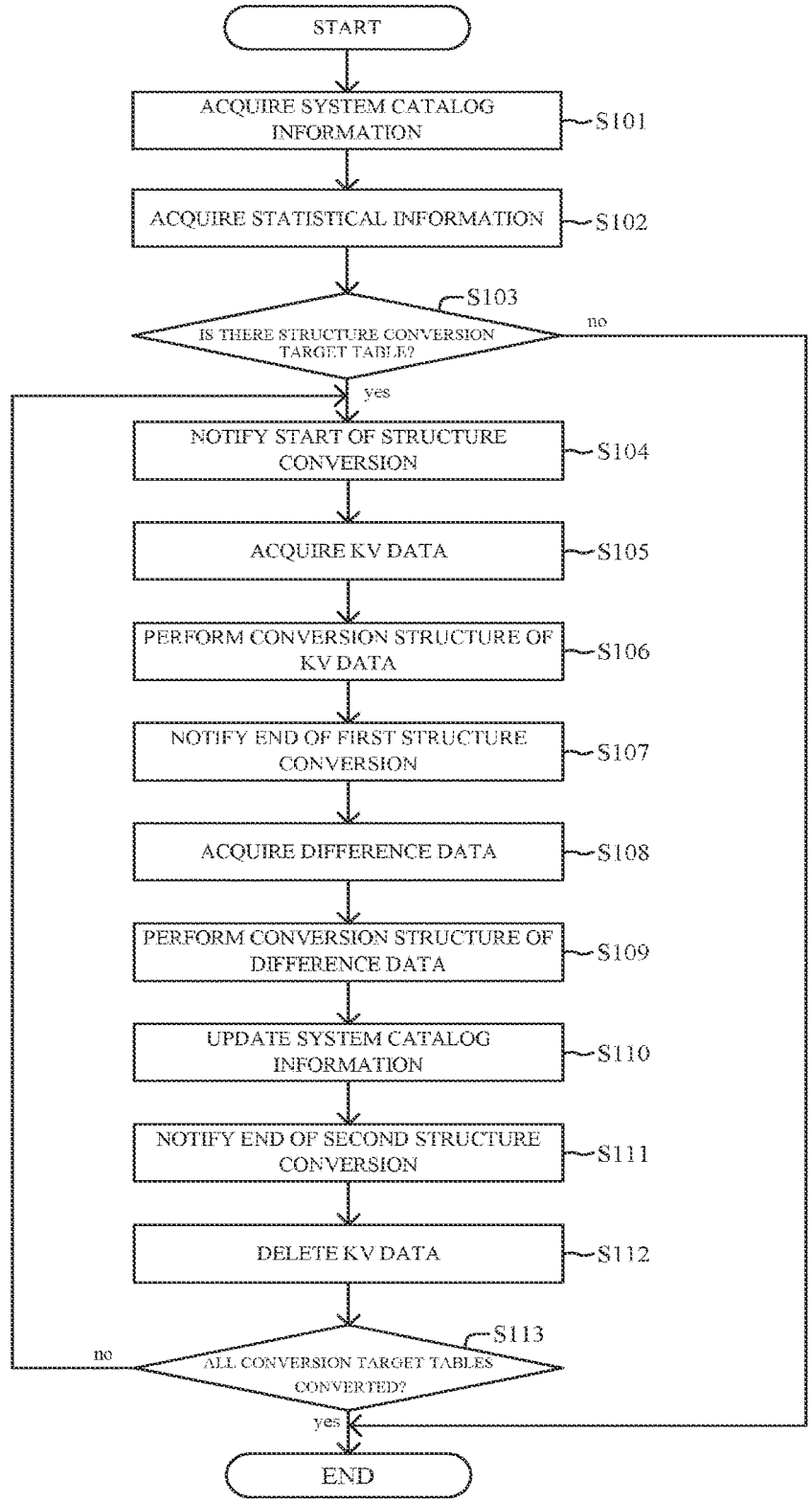

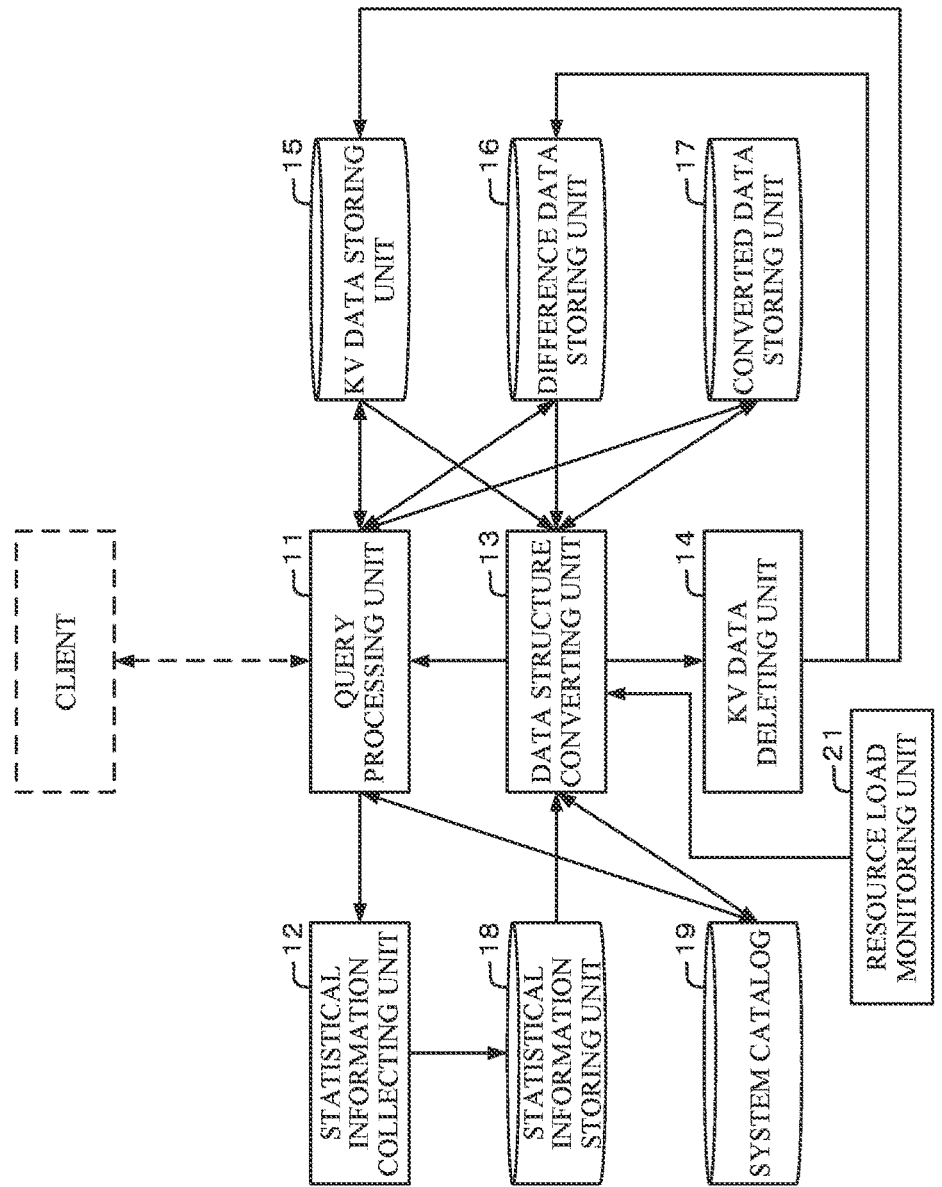

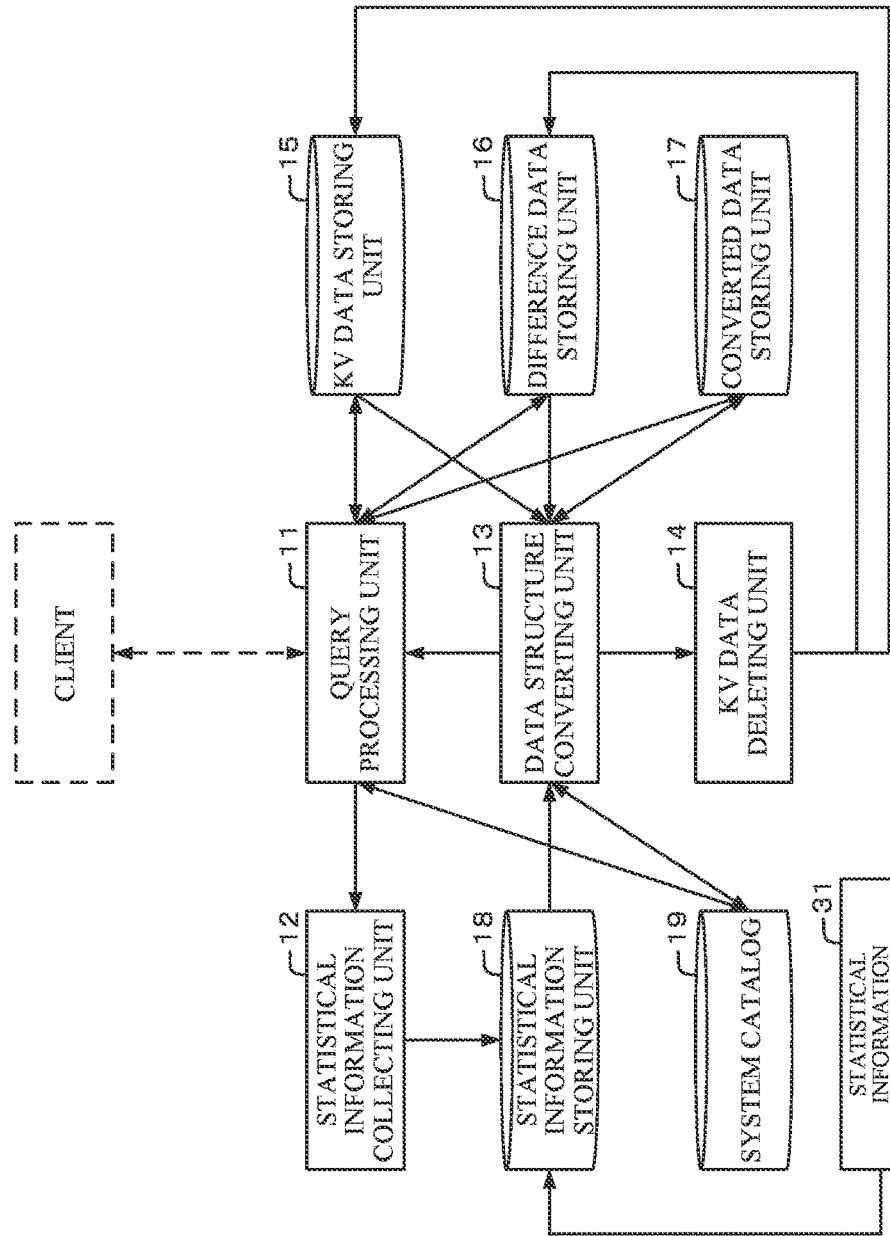

Fig.13

| TABLE | KV STRUCTURE | KV STRUCTURE CONVERSION TIME |
|---|---|---|
| TABLE A | FLAT | 2013/11/28 10:00 |
| TABLE B | CLUSTER | 2013/11/28 10:00 |
| TABLE C | CLUSTER | 2013/11/28 10:00 |
| TABLE A | CLUSTER | 2013/12/28 12:00 |
| TABLE C | FLAT | 2013/12/31/12:00 |

…

INFORMATION STORAGE SYSTEM

INCORPORATION BY REFERENCE

This application is based upon and claims the benefit of priority from Japanese patent application No. 2014-057521, filed on Mar. 20, 2014, the disclosure of which is incorporated herein in its entirety by reference.

TECHNICAL FIELD

The present invention relates to an information storage system, an information storage method, and a program.

BACKGROUND ART

In recent years, as a scalable application execution infrastructure, so-called cloud computing using many computers has been drawing attention. Moreover, as a scalable data persistence unit in a cloud infrastructure, a KVS (Key Value Store) is widely known.

A KVS is a system which stores data to be stored as a pair of a key to become an identifier (Key) and the data to be stored (Value). Therefore, it is impossible to store data defined in a table of RDB (Relational DataBase) as it is into a KVS.

Then, for storing data defined in a table of RDB into a KVS, tabular data is converted into a KV (Key Value) data structure and stored into a KVS. In other words, a definition how to convert tabular data into KV data is made by the user in advance, and an inserted tabular record is converted into KV data in accordance with the definition. After change of the tabular record into KV data, the KV data obtained by the change is stored into a KVS. Storing data by such processing has been needed.

As a technique using such a KVS, for example, Patent Document 1 is known. Patent Document 1 discloses a computer system which can handle part of data stored into a KVS in a particular way. To be specific, Patent Document 1 discloses a computer system including: a management range manager that manages data distributed and placed into a plurality of computers configuring a database; and a specific data manger that allocates a specific region, which is a storage region other than a storage region configuring the database, to specific data. According to Patent Document 1, for example, setting frequently-accessed data as specific data can make processing of specific data faster without decrease of access performance.
Patent Document 1: WIPO Publication No. 2013-118270

There are some types as a method for converting tabular data into KV data, and the respective conversion methods have merits and demerits depending on queries to be processed. However, the system as disclosed in Patent Document 1 has a problem that once tabular data is converted into KV data and stored into a KVS, it is impossible to change the KV data into KV data by another conversion method afterward.

Therefore, even if a conversion method first defined by the user is not an appropriate conversion method for a workload to be executed, it is impossible to change the KV data into KV data by another conversion method. Moreover, even if the workload has changed from the start of operation and the first defined conversion method is no longer an appropriate conversion method for a currently executed workload, it is impossible to change the KV data into KV data by another conversion method. As a result, there is a problem that in a case where a wrong conversion method has been defined or an appropriate conversion method for a workload has changed, it is difficult to fully utilize computer resources and cause a KVS to provide sufficient performance.

Thus, a KVS has had a problem that it is difficult to keep performance in a case where, for example, the use condition has changed.

SUMMARY

Accordingly, an object of the present invention is to provide an information storage system which solves the problem that it is hard to keep performance in a case where, for example, the use condition has changed.

In order to achieve the object, an information storage system as an aspect of the present invention includes:
a data storing unit storing key value data in which a key is one of a plurality of elements of record data composed of the elements and the key is associated with a value including one or a plurality of record data; and
a data structure converting unit converting a data structure of the key value data stored by the data storing unit into another data structure by changing the key.

The data structure converting unit performs conversion of the data structure of the key value data stored by the data storing unit in accordance with a use condition of the key value data.

Further, an information storage method as another aspect of the present invention includes:
acquiring a use condition of key value data stored by a data storing unit; and
converting a data structure of the key value data stored by the data storing unit into another data structure by changing a key of the key value data based on the acquired use condition.

Further, a non-transitory computer-readable medium storing a program as another aspect of the present invention is a non-transitory computer-readable medium storing a program including instructions for causing an information processing device to realize:
a data storing unit storing key value data in which a key is one of a plurality of elements of record data composed of the elements and the key is associated with a value including one or a plurality of record data; and
a data structure converting unit converting a data structure of the key value data stored by the data storing unit into another data structure by changing the key.

The data structure converting unit performs conversion of the data structure of the key value data stored by the data storing unit in accordance with a use condition of the key value data.

With the configurations as described above, the present invention can provide an information storage system which can keep performance even if, for example, the use condition has changed.

BRIEF DESCRIPTION OF DRAWINGS

FIG. 2 is a table showing an example of tabular data;
FIG. 3 is a table showing an example of flat-structured KV data stored by a KV data storing unit shown in FIG. 1;
FIG. 4 is a table showing an example of cluster-structured KV data stored by the KV data storing unit shown in FIG. 1;

FIGS. 5A to 5C are tables showing examples of indexes stored by the KV data storing unit shown in FIG. 1;

FIG. 6 is a table showing an example of statistical information stored by a statistical information storing unit shown in FIG. 1;

FIG. 7 is a table showing an example of system catalog information stored by a system catalog shown in FIG. 1;

FIG. 8 is a flowchart showing the operation of a KV store when a query is inputted by a client in the first exemplary embodiment of the present invention;

FIG. 9 is a flowchart showing a flow in conversion of a data structure in the first exemplary embodiment of the present invention;

FIG. 10 is a block diagram showing the configuration of a KV store according to a second exemplary embodiment of the present invention;

FIG. 11 is a block diagram showing the configuration of a KV store according to a third exemplary embodiment of the present invention;

FIG. 13 is a table showing an example of system catalog information stored by a system catalog shown in FIG. 12;

EXEMPLARY EMBODIMENT

Next, exemplary embodiments of the present invention will be described in detail referring to the attached drawings.

First Exemplary Embodiment

In a first exemplary embodiment of the present invention, a KVS (Key Value Store) 1 which converts tabular data into data of the KV (Key Value) format and stores the data will be described. In other words, the KVS 1 in this exemplary embodiment is an information storage system which stores KV data including combinations of values composed of record data to be stored with keys which are information for identifying the values. Moreover, as described later, the KVS 1 in this exemplary embodiment stores KV data with a flat structure (a first data structure) or a cluster structure (a second data structure). The KVS 1 is configured to be able to perform data structure conversion between the flat structure and the cluster structure depending on the use condition of KV data. The details of the flat structure and the cluster structure will be described later.

Figure 1:
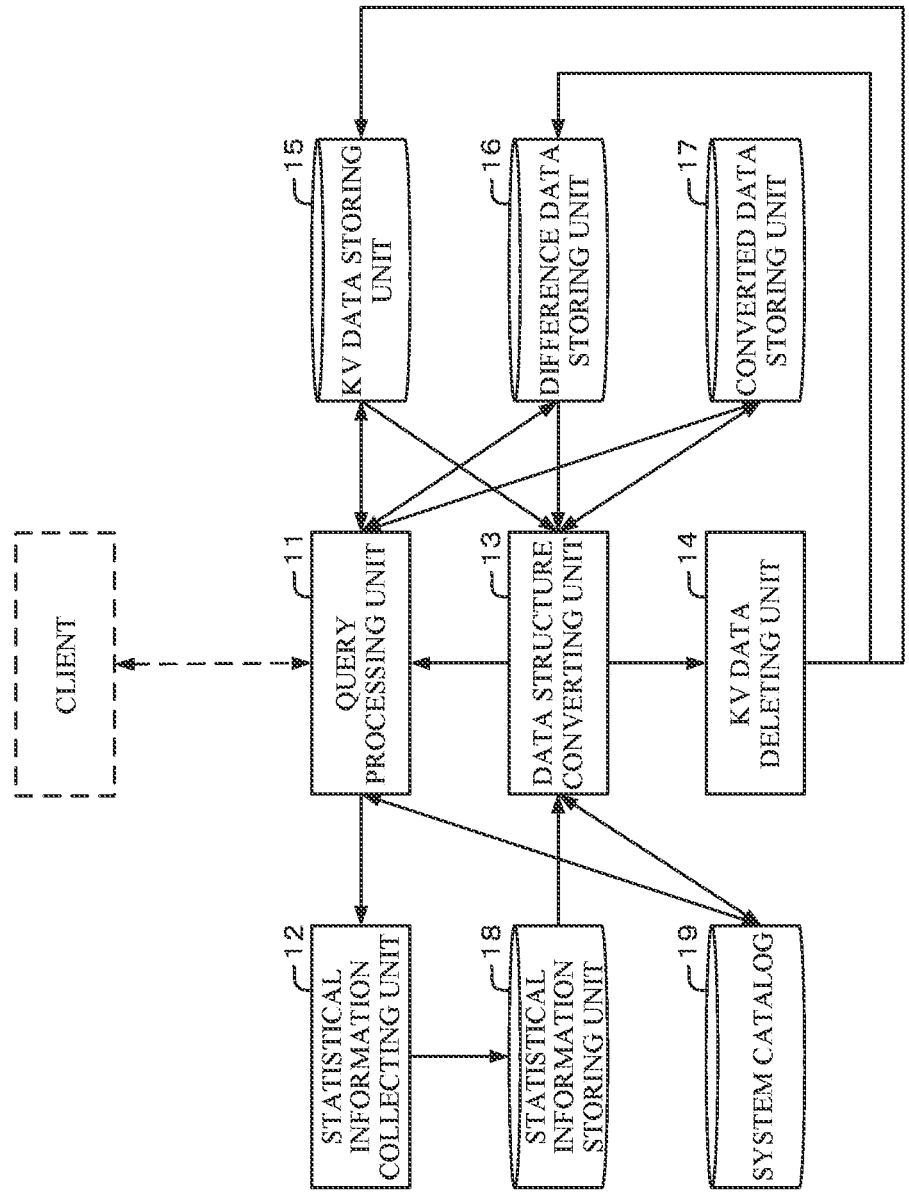
FIG. 1 is a block diagram showing the configuration of a KVS according to a first exemplary embodiment of the present invention.

Referring to FIG. 1, the KVS 1 according to the first exemplary embodiment of the present invention has a query processing unit 11 (a search processing unit), a statistical information collecting unit 12, a data structure converting unit 13, a KV data deleting unit 14, a KV data storing unit 15 (a data storing unit), a difference data storing unit 16, a converted data storing unit 17, a statistical information storing unit 18, and a system catalog 19.

The KVS 1 in this exemplary embodiment includes, for example, an information processing device including the query processing unit 11, the statistical information collecting unit 12, the data structure converting unit 13, the KV data deleting unit 14, the statistical information storing unit 18 and the system catalog 19, and a storage device including the KV data storing unit 15, the difference data storing unit 16 and the converted data storing unit 17. The information processing device includes a central processing unit (CPU), which is not shown in the drawings, and a storage device (a memory and a hard disk), which is not shown in the drawings. The respective functions (unit) mentioned above are realized by execution of a program included in the storage device by the CPU. The storage device can be configured by one storage device or a plurality of storage devices.

In the above case, the information processing device and the storage device are connected so as to be able to communicate with each other via a network. Transmission and reception of information by the information processing device and the storage device enables response to a query from a client. Meanwhile, the configuration of the KVS 1 is not limited to the above case. The KVS 1 may include one information processing device, or may include a plurality of information processing devices.

The query processing unit 11 has a function of accepting a query from a client and processing the accepted query. Upon accepting a query from a client, the query processing unit 11 searches the KV data storing unit 15, the difference data storing unit 16 and the converted data storing unit 17 in response to the query while referring to the system catalog 19 to be described later. Then, the query processing unit 11 acquires appropriate KV data for the accepted query from the searched KV data storing unit 15, difference data storing unit 16 and converted data storing unit 17. After that, the query processing unit 11 executes a given process corresponding to the query. Moreover, the query processing unit 11 transmits statistical information corresponding to the trend of queries and the result of search to the statistical information collecting unit 12.

Queries inputted by a client in this exemplary embodiment include reference queries and update queries. When a query inputted by a client is a reference query, the query processing unit 11 acquires KV data from the respective storing unit (the KV data storing unit 15, the difference data storing unit 16, and the converted data storing unit 17), and thereafter, transmits the acquired KV data to the client as the abovementioned given process. On the other hand, when a query inputted by a client is an update query, the query processing unit 11 acquires KV data from the respective storing unit, and thereafter, updates the KV data and writes the updated stored data back into the storage unit as the abovementioned given process. Then, the query processing unit 11 notifies the client of the result of the process.

What storing unit the query processing unit 11 searches among the KV data storing unit 15, the difference data storing unit 16 and the converted data storing unit 17 changes depending on a stage in data structure conversion processing by the data structure converting unit 13 to be described later. Likewise, what storing unit the query processing unit 11 writes an update result corresponding to an update query back into among the KV data storing unit 15, the difference data storing unit 16 and the converted data storing unit 17 changes depending on a stage in data structure conversion processing by the data structure converting unit 13. The change of a destination to search and a destination to write an update depending on a stage in data structure conversion processing by the data structure converting unit 13 will be described in detail afterward.

Further, the query processing unit 11 may be configured to when writing update data back into the difference data storing unit 16 or the converted data storing unit 17, refer to a clock part, which is not shown in the drawings, and add information indicating update time to record data composing KV data. To be specific, regarding flat-structured KV data, the query processing unit 11 adds information indicating update time to each KV data. On the other hand, regarding cluster-structured KV data, the query processing unit 11 adds information indicating update time to each record data contained in one KV data. Thus, it is possible to solve a problem of a probability that it becomes unknown whether or not information in the difference data storing unit 16 to be described later is up to date. The query processing unit 11 may be configured to when writing update data back, add information indicating update time to record data composing KV data at all times.

The statistical information collecting unit 12 has a function of acquiring from the query processing part 11, statistical information based on the trend of queries inputted by a client or the result of search corresponding to an inputted query. The statistical information collecting unit 12 collects as statistical information, for example, an accessed table, accessed time, a searched column, the number of accessed KV data, and the number of record data referred to or updated and the number of record data not referred to or updated among the accessed KV data. Then, the statistical information collecting unit 12 writes the collected statistical information into the statistical information storing unit 18 to be described later. Meanwhile, statistical information collected by the statistical information collecting unit 12 is not limited to the example shown above. The statistical information collecting unit 12 may collect statistical information other than the example shown above.

The data structure converting unit 13 has a function of controlling the whole data structure conversion processing executed in the KVS 1. The data structure converting unit 13 in this exemplary embodiment determines whether or not to start data structure conversion processing by referring to statistical information stored by the statistical information storing unit 18 and system catalog information stored by the system catalog 19 to be described later, for example, regularly. Further, the data structure converting unit 13 executes data structure conversion processing, which is conversion of the data structure of KV data stored by the KV data storing unit 15 or the difference data storing unit 16 between the flat structure and the cluster structure. Furthermore, the data structure converting unit 13 executes control of the destination of search by the query processing unit 11 or the destination to write update data thereby. The data structure converting unit 13 in this exemplary embodiment is configured to regularly refer to the abovementioned statistical information and system catalog information, for example, by utilizing a clock part, which is not shown in the drawings.

The data structure conversion processing executed by the data structure converting unit 13 and the control of the destination of search and the destination to write update data executed on the query processing unit 11 will be described in detail. Meanwhile, the determination executed by the data structure converting unit 13 whether or not to start the data structure conversion processing will be described later.

Upon starting the data structure conversion processing, firstly, the data structure converting unit 13 notifies the query processing unit 11 of the start of the data structure conversion processing. To be specific, the data structure converting unit 13 notifies the query processing unit 11 of information of a table (KV data) to be subjected to the data structure conversion processing.

Upon accepting the notification, the query processing unit 11 changes the later destination to write the result (update data) of update processing on the table to be subjected to the data structure conversion processing from the KV data storing unit 15 to the difference data storing unit 16. Further, the query processing unit 11 searches the KV data storing unit 15 and the difference data storing unit 16 in accordance with a query received from a client after the notification.

Next, the data structure converting unit 13 extracts KV data to be subjected to conversion of the structure of KV data (KV data according to the query) from the KV data storing unit 15, and converts the data structure of the extracted KV data. The data structure converting unit 13 then stores the KV data with its data structure converted into the converted data storing unit 17.

After converting the data structure of the conversion target KV data stored in the KV data storing unit 15 and storing the KV data into the converted data storing unit 17, the data structure converting unit 13 notifies the query processing unit 11 of completion of a first phase of the data structure conversion processing.

Upon acceptance of the notification, the query processing unit 11 changes the later destination to write the result (update data) of update processing on the table to be subjected to the data structure conversion processing from the difference data storing unit 16 to the converted data storing unit 17. Further, the query processing unit 11 searches the converted data storing unit 17 and the difference data storing unit 16 in accordance with a query received from a client after the notification.

Subsequently, the data structure converting unit 13 acquires KV data stored in the difference data storing unit 16, and converts the data structure of the acquired KV data. Then, the data structure converting unit 13 stores the KV data with its data structure converted into the converted data storing unit 17.

After converting all data stored in the difference data storing unit 16, the data structure converting unit 13 notifies the query processing unit 11 of completion of a second phase of the data structure conversion processing.

Upon acceptance of the notification, the query processing unit 11 searches only the converted data storing unit 17 afterward. Further, the query processing unit 11 writes update data into the update data storing unit 17.

After converting all the data stored in the difference data storing unit 16, the data structure converting unit 13 asks the KV data deleting unit 14, which will be described later, to delete the converted KV data. After that, the KV data with their data structures converted are deleted by the KV data deleting unit 14 as described later.

That is the detailed description of the data structure conversion processing executed by the data structure converting unit 13 and the control of a search destination and an update data writing destination on the query processing unit 11.

As mentioned above, in a stage after the end of the first phase before the end of the second phase, the destinations of search by the query processing unit 11 are the converted data storing unit 17 and the difference data storing unit 16. On the other hand, the destination to write update data by the query processing unit 11 is the converted data storing unit 17. Therefore, data stored by the difference data storing unit 16 may be older than data stored by the converted data storing unit 17. In other words, it may be unknown which data is newer, the data stored by the difference data storing unit 16 or the data stored by the converted data storing unit 17. In order to solve this problem, as mentioned above, the query processing unit 11 may be configured to when writing update data back into the difference data storing unit 16 or the converted data storing unit 17, add information representing update time to record data composing KV data. Such a configuration enables the query processing unit 11 to specify the latest KV data by referring to the update time of the record data contained in the KV data.

Change of the destinations of search and writing of update data by the query processing unit 11 is summarized as follows:
Before Data Structure Conversion Processing
Search destination KV data storing unit 15
Destination of writing of update data KV data storing unit 15;
After Start of Data Structure Conversion Processing Before End of First Phase
Search destination KV data storing unit 15 and difference data storing unit 16
Destination of writing of update data difference data storing unit 16;
After End of First Phase Before End of Second Phase
Search destination converted data storing unit 17 and difference data storing unit 16
Destination of writing of update data converted data storing unit 17;
After End of Second Phase
Search destination converted data storing unit 17
Destination of writing of update data converted data storing unit 17.

Further, the data structure conversion processing executed by the data structure converting unit 13 is summarized as follows:
When Data Structure Conversion Processing Starts
Convert data structure of conversion target KV data stored by KV data storing unit 15;
When Data Structure Conversion Processing (First Phase) on KV Data Storing unit 15 Ends
Convert data structure of KV data stored in difference data storing unit 16;
When Data Structure Conversion Processing (Second Phase) on Difference Data Storing unit 16 Ends
Ask KV data deleting unit 14 to delete KV data with data structure converted.

The KV data deleting unit 14 has a function of deleting KV data with their data structures converted (KV data after data structure conversion), which are stored in the KV data storing unit 15 and the difference data storing unit 16. As described above, the KV data deleting unit 14 deletes KV data with their data structures converted, which are stored in the KV data storing unit 15 and the difference data storing unit 16, in response to a request by the data structure converting unit 13.

The KV data storing unit 15 is composed of a storage device such as a hard disk or a memory, and is configured by a KVS. The KV data storing unit 15 stores KV data referred to or updated by a client. As mentioned above, in the stage before the data structure conversion processing by the data structure converting unit 13 and in the stage after the start of the data structure conversion processing before the end of the first phase, the query processing unit 11 searches the KV data storing unit 15 and executes reference/update processing. Moreover, in the stage before the data structure conversion processing, updated KV data is written into the KV data storing unit 15.

To be specific, the KV data storing unit 15 stores KV data obtained by converting tabular data by using either the flat structure or the cluster structure. Moreover, the KV data storing unit 15 stores an index to be described later. The data structure (flat structure or cluster structured) of KV data into which the KV data storing unit 15 converts tabular data can be selected for each table.

Herein, the structure of KV data in this exemplary embodiment will be described using an example. As mentioned above, the KVS 1 in this exemplary embodiment converts tabular data into flat-structured KV data or cluster-structured KV data and stores the KV data. Therefore, among data structures of KV data, the flat structure and the cluster structure will be described below.

Referring to FIG. 2, it is assumed there is tabular data having "product ID," "product name," "product category," "stock" and "price" as listing names (column names), for example. Moreover, in the tabular data shown in FIG. 2, a primary key (PK) is a product ID. In other words, the tabular data shown in FIG. 2 is configured so that each record can be uniquely identified by using a product ID.

To be specific, for example, a case where tabular data has records as shown below is assumed:
(product ID, product name, product category, stock, price)
(i1, product A, personal computer, 10, 120000)
(i2, product B, personal computer, 3, 100000)
(i3, product C, smartphone, 5, 35000)
(i4, product D, tablet, 8, 50000)
(i5, product E, smartphone, 15, 25000).

In this case, when the tabular data is converted into flat-structured KV data, data as shown in FIG. 3 is obtained, for example. Referring to FIG. 3, the flat-structured KV data is KV data in which a key is a primary key and a value is a collection of all the field values of the tabular data. Further, in the flat structure, one of KV data corresponds to one record data of tabular data To be specific, when the abovementioned tabular data is converted into the flat-structured KV data, data as shown below is obtained, for example:
{(key), (value)}
{(i1), (i1, product A, personal computer, 10, 120000)}
{(i2), (i2, product B, personal computer, 3, 100000)}
{(i3), (i3, product C, smartphone, 5, 35000)}
{(i4), (i4, product D, tablet, 8, 50000)}
{(i5), (i5, product E, smartphone, 15, 25000)}.

Thus, the flat structure is a data structure in which one of record data corresponds to one of KV data. Therefore, in flat-structured KV data, it is possible to search for only desired record data by using a key. Accordingly, it can be said that the flat structure is suitable for search and update processing with a column having a unique value such as a primary key.

Next, a case of converting the tabular data shown in FIG. 2 into cluster-structured KV data will be described. First, in order to convert tabular data into the cluster structure, there is a need to previously set a key column (a cluster key column) for configuring a cluster. Thus, for example, a product category column is assumed to be a cluster key column. Then, when the abovementioned tabular data is converted into cluster-structured KV data in which the product category column is the cluster key column, data as shown in FIG. 4 is obtained, for example. Referring to FIG. 4, the cluster-structured KV data is KV data in which a key is a cluster key value and a value is a collection of records having the same cluster key value. Therefore, in the cluster structure, one of KV data corresponds to one record data or a plurality of record data of tabular data.

To be specific, when the abovementioned tabular data is converted into the cluster-structured KV data, data as shown below is obtained, for example:

{(key), (value)}
{(personal computer), (i1, product A, personal computer, 10, 120000) (i2, product B, personal computer, 3, 100000)}
{(smartphone), (i3, product C, smartphone, 5, 35000) (i5, product E, smartphone, 15, 25000)}
{(tablet), (i4, product D, tablet, 8, 50000)}.

Thus, the cluster structure is a data structure in which a plurality of record data can correspond to one of KV data. Thus, in cluster-structured KV data, it is possible to search for a plurality of record data at a time by using a key. Therefore, the cluster structure is suitable for search and update processing using a key with high multiplicity.

Further, the KVS 1 designates a key and acquires data (a value). Therefore, in principle, it is impossible to access data without using a key. For example, in the flat-structured KV data shown in FIG. 3, as mentioned above, a product ID value is a key. Therefore, in the example shown in FIG. 3, it is impossible to acquire KV data under a search condition other than the product ID column. Thus, in order to enable designation of any column as a search condition, an index, which is the abovementioned structure, is used.

An Index is KV data in which a key is the content of a column for which an index is created and a value is a primary key or primary keys of records having the same content of the column for which the index is created (i.e., a value is a key of KV data which is the object of the index). Referring to FIG. 5, for example, it is possible to create indexes as shown below. Meanwhile, an index other than shown below may be created.
{(key), (value)}
 Index A
{(personal computer), (i1, i2)}
{(smartphone), (i3, i5)}
{(tablet), (i4)}
 Index B
{(product A), (i1)}
{(product B), (i2)}
{(product C), (i3)}
{(product D), (i4)}
{(product E), (i5)}
 index C
{(product A), (personal computer)}
{(product B), (personal computer}
{(product C), (smartphone)}
{(product D), (tablet)}
{(product E), (smartphone)}

Among the three indexes shown above, the index A and the index B are indexes for the flat-structured KV data shown in FIG. 3. For example, use of the index A enables acquisition of KV data using the product category column, which is other than the product ID column, as the search condition. Moreover, use of the index B enables acquisition of KV data using the product name column as the search condition.

On the other hand, the index C is an index for the cluster-structured KV data shown in FIG. 4. Use of the index C enables acquisition of KV data using the product name column as the search condition.

The KV data storing unit 15 in this exemplary embodiment stores the flat-structured KV data, the cluster-structured KV data, and the indexes. As mentioned above, it is possible to select for each table whether to use the flat structure or the cluster structure to store KV data.

The difference data storing unit 16 is composed of a storage device such as a hard disk or a memory, and is configured by a KVS. As mentioned above, the difference data storing unit 16 is a storage device which is the destination of writing of update data by the query processing unit 11 in the stage after the start of the data structure conversion processing before the end of the first phase. Moreover, the difference data storing unit 16 is the target of data search by the query processing unit 11 in the stage after the start of the data structure conversion processing before the end of the second phase.

The converted data storing unit 17 is composed of a storage device such as a hard disk or a memory, and is configured by a KVS. As mentioned above, the converted data storing unit 17 stores KV data with its data structure converted by the data structure converting unit 13. Moreover, the converted data storing unit 17 is the destination of writing of data update and the target of data search by the query processing unit 11 in the stage after the end of the first phase of the data structure conversion processing.

Thus, the KV data storing unit 15, the difference data storing unit 16 and the converted data storing unit 17 are all configured by a KVS. As mentioned above, the KV data storing unit 15, the difference data storing unit 16 and the converted data storing unit 17 may be composed of one storage device, or may be composed of a plurality of storage devices. As far as KV data stored in the KV data storing unit 15, the difference data storing unit 16 and the converted data storing unit 17 are all in one KVS, the configuration is not particularly limited.

The statistical information storing unit 18 is composed of a storage device such as a hard disk or a memory. As mentioned above, the statistical information storing unit 18 stores statistical information collected by the statistical information collecting unit 12.

Referring to FIG. 6, the statistical information storing unit 18 stores, for example, "table," "accessed time," "searched column," "accessed KV number," "processed record number" and "not-processed record number, as statistical information.

Herein, "table" is the name of a table having been accessed. "Accessed time" is time of access to the table having been accessed. "Searched column" is a column having been searched and indicates a listing name (a column name). "Accessed KV number" is the number of KV data accessed by the query processing unit 11. "Processed record number" is the number of record data having been processed in the KV data accessed by the query processing unit 11. "Not-processed record number" is the number of record data having not been processed in the KV data accessed by the query processing unit 11. Herein, processing refers to reference processing or update processing.

To be specific, the statistical information storing unit 18 stores statistical information as shown below, for example (see FIG. 6). The statistical information shown below is an example of statistical information which can be stored by the statistical information storing unit 18.
(table, accessed time, searched column, accessed KV number, processed record number, not-processed record number)
(tableA, 2013/11/28 10:01, product ID, 1, 1, 0)
(table B, 2013/11/28 10:02, user name, 1, 30, 0)
(tableA, 2013/11/28 10:03, product category, 121, 120, 0)
(table C, 2013/11/28 10:04, order ID, 1, 1, 180)
(table B, 2013/11/28 10:05, user name, 1, 20, 0)
(table C, 2013/11/28 10:06, order ID, 1, 1, 200)
(tableA, 2013/11/28 10:07, product category, 151, 150, 0)

The statistical information storing unit 18 acquires such statistical information from the statistical information collecting unit 12 and stores the statistical information. Then, as mentioned above, the statistical information stored by the statistical information storing unit 18 is transmitted to the data structure converting unit 13, for example, regularly in this exemplary embodiment. After that, the statistical information is utilized when the data structure converting unit 13 determines whether to start the data structure conversion processing.

The statistical information stored by the statistical information storing unit 18 is not limited to the example shown above. Other than the example shown above, the statistical information storing unit 18 can store statistical information according to collection of statistical information by the statistical information collecting unit 12.

Further, all statistical information since the start of the system operation is stored in the statistical information storing unit 18 in this exemplary embodiment. However, statistical information transmitted to the data structure converting unit 13 among the statistical information stored in the statistical information storing unit 18 may be limited to, for example, statistical information after KV structure conversion time stored in the system catalog information to be described later. Such control can be realized by, for example, referring to the system catalog information when the data structure converting unit 13 acquires statistical information from the statistical information storing unit 18. By thus limiting statistical information received by the data structure converting unit 13 to statistical information after the KV structure conversion time, it is possible to determine whether or not to execute the data structure conversion processing so as to fit to the realities. Besides, the statistical information storing unit 18 may be configured to delete statistical information which is older than a predetermined time.

The system catalog 19 is composed of a storage device such as a hard disk or a memory. The system catalog 19 stores system catalog information, which is information about the data structure of the KV data stored in the KV data storing unit 15, the difference data storing unit 16 and the converted data storing unit 17.

As shown in FIG. 7, the system catalog 19 stores, for example, "table," "KV Structure" and "KV Structure Conversion Time" as the system catalog information.

Herein, "table" indicates the name of the table existing in each of the storing unit. "KV structure" contains information whether the table indicated by "table" has been converted into flat-structured KV data or cluster-structured KV data. "KV structure conversion time" contains information about time of the last conversion of the data structure of the KV data.

To be specific, it is assumed the system catalog 19 stores system catalog information as shown below, for example (see FIG. 7). The system catalog information shown below is an example of system catalog information which can be stored by the system catalog 19.
(table, KV structure, KV structure conversion time)
(table A, FLAT, 2013/11/28 10:00)
(table B, CLUSTER, 2013/11/28 10:00)
(table C, CLUSTER, 2013/11/28 10:00)

The system catalog 19 acquires such system catalog information by communicating with the data structure converting unit 13. Then, as mentioned above, the system catalog information stored by the system catalog 19 is transmitted to the data structure converting unit 13, for example, regularly in this exemplary embodiment. After that, the system catalog information is utilized when the data structure converting unit 13 determines whether to start the data structure conversion processing. Moreover, as mentioned above, the system catalog information can be utilized when the data structure converting unit 13 acquires statistical information from the statistical information storing unit 18.

The system catalog information stored by the system catalog 19 is not limited to the example shown above. The system catalog 19 may store system catalog information about an item other than shown above. In this exemplary embodiment, the system catalog 19 is configured to store a current KV structure and KV structure conversion time that is time of the last conversion of the structure, as the system catalog information. However, the system catalog 19 may be configured to store, for example, a conversion history since the start of the system operation as the system catalog information.

Herein, an example of determination whether or not to start the data structure conversion processing executed by the data structure converting unit 13 will be described using the statistical information stored by the statistical information storing unit 18 and the system catalog information stored by the system catalog 19 shown above as examples.

As mentioned above, the data structure converting unit 13 acquires the statistical information stored by the statistical information storing unit 18 and the system catalog information stored by the system catalog 19, for example, by using a clock part or the like. The data structure converting unit 13 then refers to the statistical information and the system catalog information and determines whether or not there is a table to become the target of KV data structure conversion.

To be specific, the data structure converting unit 13 determines whether or not to perform conversion from the flat structure into the cluster structure, for example, by a method as described below. First, the data structure converting unit 13 refers to the system catalog information and finds a table whose KV structure is flat. Referring to FIG. 7, it is found that the data structure of the table A is flat in the exemplified case. Next, the data structure converting unit 13 refers to the statistical information and finds the most searched column. Referring to FIG. 6, the number of times that the table A has been searched with a product ID is one and the number of times that the table A has been searched with a product category is two in the exemplified case. Therefore, the data structure converting unit 13 finds the product category column as the most searched column. The most searched column becomes a candidate of a cluster key for conversion into the cluster structure. Then, the data structure converting unit 13 compares the average of the accessed KV numbers of the most searched column (not limited to use of the average) with a predetermined flat-cluster conversion threshold (a first data conversion threshold), and determines whether or not to convert into the cluster structure with the product category column as the cluster key. For example, it is assumed that the flat-cluster conversion threshold is set to 100 in advance. Referring to FIG. 6, the average of the accessed KV numbers of the product category column is 136. Therefore, in the exemplified case, the data structure converting unit 13 determines that the average of the accessed KV numbers of the product category column exceeds the flat-cluster conversion threshold, and determines to start the data structure conversion processing, which is conversion into the cluster structure with the product category key as the cluster key. That is the example of determination whether or not to perform conversion from the flat structure into the cluster structure executed by the data structure converting unit 13. The flat-cluster conversion threshold is previously set by the user, for example.

Further, the data structure converting unit 13 determines whether or not to perform conversion from the cluster structure into the flat structure, for example, by a method as described above. First, the data structure converting unit 13 refers to the system catalog information and finds a table whose KV structure is cluster. Referring to FIG. 7, it is found that the data structures of the tables B and C are cluster in the exemplified case. Next, the data structure converting unit 13 refers to the statistical information and finds the most searched column. Referring to FIG. 6, in the exemplified case, the most searched column in the table B is the user name column, and the most searched column in the table C is the order ID column. Then, the data structure converting unit 13 determines whether or not to convert into the flat structure based on the ratio between the processed record number and the not-processed record number of the most searched column. To be specific, the data structure converting unit 13 compares a value obtained from the following expression with a predetermined cluster-flat conversion threshold (a second data conversion threshold) and, when the value obtained from the following expression is equal to or less than the cluster-flat conversion threshold, determines to convert into the flat structure:

Value=processed record number/(processed record number+non-processed record number), wherein when there are a plurality of processed record numbers and not-processed record numbers to become the target, the abovementioned value is calculated, for example, by using the average.

For example, it is assumed that the cluster-flat conversion threshold is set to $1/50$ in advance. Referring to FIG. 6, the value obtained from the above expression with respect to the table B is 1. Moreover, the value obtained from the above expression with respect to the table C is $1/191$. Therefore, the data structure converting unit 13 determines not to execute the data structure conversion processing on the table B. On the other hand, the data structure converting unit 13 determines to execute the data structure conversion processing on the table C. That is the example of determination whether or not to perform conversion from the cluster structure into the flat structure executed by the data structure converting unit 13. The cluster-flat conversion threshold is previously set by the user, for example.

That is the example of determination whether or not to start the data structure conversion processing executed by the data structure converting unit 13. When the data structure converting unit 13 determines to start the data structure conversion processing, the data structure conversion processing is executed by the data structure converting unit 13 as described above. Meanwhile, the determination whether or not to start the data structure conversion processing executed by the data structure converting unit 13 is not limited to the above example. The data structure converting unit 13 may determine whether or not to start the data structure conversion processing by a method other than the above example.

The configuration of the KVS 1 in this exemplary embodiment has been described above. In the description of this exemplary embodiment, statistical information stored by the statistical information storing unit 18 and system catalog information stored by the system catalog 19 are tabular data. However, these data need not to be stored as tabular data necessarily.

Next, the operation of the KVS 1 according to this exemplary embodiment will be described. First, the operation of the KVS 1 on input of a query by a client will be described.

First, a client inputs a query into the KVS 1. Thus, an operation shown in FIG. 8 starts.

When a client inputs a query into the KVS 1, the query processing unit 11 of the KVS 1 receives the query. Then, the query processing unit 11 analyzes the received query, and searches for and specifies access target KV data based on the result of the analysis and system catalog information acquired from the system catalog 19. Then, the query processing unit 11 acquires the specified KV data (S001).

What storing unit the query processing unit 11 searches among the KV data storing unit 15, the difference data storing unit 16 and the converted data storing unit 17 varies depending on a stage in the data structure conversion processing by the data structure converting unit 13. To be specific, the query processing unit 11 searches in the following manner:

Before Data Structure Conversion Processing
Search KV data storing unit 15
After Start of Data Structure Conversion Processing Before End of First Phase
Search KV data storing unit 15 and difference data storing unit 16
After End of First Phase Before End of Second Phase
Search converted data storing unit 17 and difference data storing unit 16
After End of Second Phase
Search converted data storing unit 17.

Next, the query processing unit 11 inputs statistical information into the statistical information collecting unit 12 (S002). When given the statistical information by the query processing unit 11, the statistical information collecting unit 12 stores the inputted statistical information into the statistical information storing unit 18.

Subsequently, the query processing unit 11 determines whether the inputted query is a query for execution of update processing or a query for execution of reference processing (S003). In a case where the inputted query is a query for execution of update processing, the query processing unit 11 executes data update processing (S004), and returns the result of the update processing to the client (S005). Moreover, the query processing unit 11 writes the updated data into the storing unit.

What storing unit the query processing unit 11 writes the updated data into among the KV data storing unit 15, the difference data storing unit 16 and the converted data storing unit 17 varies depending on a stage in the data structure conversion processing by the data structure converting unit 13. To be specific, the query processing unit 11 writes the updated data in the following manner:

Before Data Structure Conversion Processing
Write updated data into KV data storing unit 15
After Start of Data Structure Conversion Processing Before End of First Phase
Write updated data into difference data storing unit 16
After End of First Phase Before End of Second Phase
Write updated data into converted data storing unit 17
After End of Second Phase
Write updated data into converted data storing unit 17.

When writing updated data into the difference data storing unit 16 and the converted data storing unit 17, the query processing unit 11 may add information indicating updated time to record data composing KV data, for example, by referring to a clock part which is not shown in the drawings.

On the other hand, in a case where the inputted query is a query for execution of reference processing, the query processing unit 11 returns the acquired KV data as the result of reference processing to the client (S006).

That is the operation of the KVS 1 when a query is inputted by a client. By thus operating, the KVS 1 can return to the client a reference result or an update result corresponding to the query inputted by the client.

As mentioned above, in the stage after the end of the first phase before the end of the second phase, the destinations of search by the query processing unit 11 are the converted data storing unit 17 and the difference data storing unit 16. On the other hand, the destination of writing of updated data by the query processing unit 11 is the converted data storing unit 17. Therefore, there is a case where data stored in the difference data storing unit 16 is older than data stored in the converted data storing unit 17. In this case, as mentioned above, the query processing unit 11 can specify the latest KV data by referring to the updated time of record data contained in KV data.

Next, an operation in the data structure conversion processing executed by the data structure converting unit 13 will be described.

Referring to FIG. 9, the data structure converting unit 13 acquires system catalog information from the system catalog 19 (S101). Moreover, the data structure converting unit 13 acquires statistical information from the statistical information storing unit 18 (S102). Meanwhile, in acquisition of statistical information by the data structure converting unit 13, the data structure converting unit 13 may refer to the system catalog information and acquire only statistical information on or after KV structure conversion time (on or after time of the last execution of the data structure conversion processing).

Storage of statistical information from the statistical information storing unit 18 and acquisition of system catalog information from the system catalog 19 by the data structure converting unit 13 are timed, for example, by a clock part or the like so as to be regularly performed. Meanwhile, the data structure converting unit 13 may, for example, acquire the abovementioned information based on a predetermined structure conversion plan or start acquisition of the abovementioned information depending on the load on the data structure converting unit 13.

Next, the data structure converting unit 13 determines whether or not there is a table to be subjected to the data structure conversion processing based on the acquired statistical information and system catalog information (S103). Whether or not a table is to be subjected to the data structure conversion processing is determined in the following manner, for example.

First, the data structure converting unit 13 refers to the system catalog information. Then, the data structure converting unit 13 distinguishes a table stored in the form of flat-structured KV data from a table stored in the form of cluster-structured KV data.

Subsequently, the data structure converting unit 13 refers to the statistical information. Then, the data structure converting unit 13 searches out the most searched column in each of the tables.

After that, regarding the table stored in the form of flat-structured KV data, the data structure converting unit 13 compares the average of the numbers of KV data accessed by using the most searched column with a predetermined flat-cluster conversion threshold. In a case where the average of the accessed KV numbers exceeds the flat-cluster conversion threshold, the data structure converting unit 13 determines to start the data structure conversion processing that is conversion of the flat structure into the cluster structure by using the most searched column as a cluster key.

Further, regarding the table stored in the form of cluster-structured KV data, the data structure converting unit 13 compares the ratio between a processed record number and a not-processed record number in the case of search using the most searched column with a cluster-flat conversion threshold. In a case where the ratio exceeds the cluster-flat conversion threshold, the data structure converting unit 13 determines to start the data structure conversion processing that is conversion from the cluster structure into the flat structure.

For example, by thus operating, the data structure converting unit 13 determines whether or not there is a table to be subjected to the data structure conversion processing. In a case where there is no table to be subjected to the data structure conversion processing, the data structure converting unit 13 skips the following operation to end the data structure conversion processing (S103, no).

On the other hand, in a case where there is a table to be subjected to the data structure conversion processing (S103, yes), the data structure converting unit 13 starts the data structure conversion processing. The data structure converting unit 13 performs the following conversion of the data structure for each table to be subjected to the data structure conversion processing target.

Upon start of the data structure conversion processing, the data structure converting unit 13 first notifies the query processing unit 11 of information of a table to be subjected to the KV structure conversion processing (S104). After reception of the notification, the query processing unit 11 writes the result of update processing executed on the table to be subjected to the data structure conversion processing into the difference data storing unit 16, instead of the KV data storing unit 15. Moreover, after the reception, the query processing unit 11 searches the KV data storing unit 15 and the difference data storing unit 16 in accordance with a query received from a client.

Next, the data structure converting unit 13 acquires all the KV data of the table to be subjected to the data structure conversion processing from the KV data storing unit 15 (S105). Then, the data structure converting unit 13 executes conversion of the data structure of the KV data acquired from the KV data storing unit 15 (S106). After that, the data structure converting unit 13 writes the KV data after conversion into the converted data storing unit 17.

Subsequently, the data structure converting unit 13 notifies the query processing unit 11 of end of the first phase of the data structure conversion processing (S107). In other words, the data structure converting unit 13 notifies the query processing unit 11 of end of the data structure conversion processing on the KV data stored in the KV data storing unit 15 among the KV data of the notified table to be subjected to the data structure conversion processing. After reception of the notification, the query processing unit 11 writes the result of update processing executed on the table to be subjected to the data structure conversion processing into the converted data storing unit 17, instead of the difference data storing unit 16. Moreover, after the reception, the query processing unit 11 searches the converted data storing unit 17 and the difference data storing unit 16 in accordance with a query received from a client.

Next, the data structure converting unit 13 acquires all the KV data of the table to be subjected to the data structure conversion processing from the difference data storing unit 16 (S108). Then, the data structure converting unit 13 executes conversion of the data structure of the KV data acquired from the difference data storing unit 16 (S109). After that, the data structure converting unit 13 writes the KV data after the conversion into the converted data storing unit 17.

Then, the data structure converting unit 13 updates the system catalog information stored by the system catalog 19 (S110). In other words, the data structure converting unit 13 changes the KV structure in the system catalog information to the converted data structure. Moreover, the data structure converting unit 13 changes the KV structure conversion time to time of execution of the data structure conversion processing.

Further, the data structure converting unit 13 notifies the query processing unit 11 of end of the second phase of the data structure conversion processing (S111). In other words, the data structure converting unit 13 notifies the query processing unit 11 of end of the data structure conversion processing on the KV data of the table to be subjected to the data structure conversion processing. After receiving the notification, the query processing unit 11 searches only the converted data storing unit 17 for data in reference processing on the table having been the target of the data structure conversion processing.

After that, the data structure converting unit 13 notifies the KV data deleting unit 14 of information on the table having been the target of the data structure conversion processing. Upon reception of the notification, the KV data deleting unit 14 deletes the KV data before the data structure conversion relating to the target table, from the KV data storing unit 15 and the difference data storing unit 16 (S112).

Then, the data structure converting unit 13 determines whether or not the data structure conversion processing has been executed on all tables to be subjected to the data structure conversion processing. In a case where the data structure conversion processing has been executed on all the tables to be subjected to the data structure conversion processing, the data structure converting unit 13 ends the data structure conversion processing (S113, yes). On the other hand, in a case where a table to be subjected to the data structure conversion processing is still left, the data structure converting unit 13 starts the data structure conversion on the table (S113, no).

That is the operation in the data structure conversion processing executed by the data structure converting unit 13.

Thus, the KVS 1 in this exemplary embodiment has the statistical information collecting unit 12 and the data structure converting unit 13. This configuration enables the KVS 1 to convert the data structure of KV data based on statistical information collected by the statistical information collecting unit 12. As a result, for example, the KVS 1 can convert the structure of KV data accessed by the user, stored depending on the trend of query processing, and optimize accessed KV data. Moreover, the query processing performance can be increased.

Further, the KVS 1 in this exemplary embodiment has the KV data storing unit 15, the difference data storing unit 16, and the converted data storing unit 17. This configuration enables the KVS 1 to change a storing unit to be searched and a storing unit as the destination of writing of update data in accordance with a stage in the data structure conversion processing executed by the data structure converting unit 13. As a result, the KVS 1 can convert the data structure of KV data without stopping a query from a client.

By using the flat-structured KV data shown in FIG. 3, the cluster-structured KV data shown in FIG. 4 and the index shown in FIG. 5, a merit of the flat structure and a merit of the cluster structure will be described in detail in the following manner.

For example, a case of searching data containing "personal computer" as the product category will be considered. In this case, in respect to the flat-structured KV data shown in FIG. 3, the index A shown in FIG. 5 is first accessed. After that, KV data whose keys are "i1" and "i2" shown in the index A of FIG. 5 are accessed. Consequently, record data containing "personal computer" as the product category can be acquired. In other words, in respect of the flat structure, the number of accessed KV data is three.

On the other hand, in a case where the same query is executed on the cluster-structured KV data shown in FIG. 4, KV data whose key is "personal computer" is accessed. Consequently, record data containing "personal computer" as the product category can be acquired. In other words, in respect of the cluster structure, the number of accessed KV data is one.

In general, access to KV data is performed via a network. Therefore, the number of times of access to KV data has a great influence on the response performance of an executed query. Moreover, as illustrated above, at the time of execution of search or update processing with a key having high multiplicity, target data can be acquired in a small number of times of access by using the cluster structure, in which a plurality of record data correspond to one of KV data. Therefore, it can be said that the cluster structure is more appropriate for execution of search or update processing with a key having high multiplicity.

Further, for example, a case of searching data containing "A" as the product name will be considered. In this example, in respect of the flat-structured KV data shown in FIG. 3, the index B shown in FIG. 5 is first accessed. After that, KV data whose key is "i1" shown in the index B of FIG. 5 is accessed. Consequently, record data in which the product name is "product A" can be acquired. In other words, in respect of the flat structure, the number of accessed KV data is two.

On the other hand, in a case where the same query is executed on the cluster-structured KV data shown in FIG. 4, the index C shown in FIG. 5 is first accessed. After that, KV data whose key is "personal computer" shown by the index C of FIG. 5 is accessed. Consequently, record data in which the product name is "product A" can be acquired. In other words, in respect of the cluster structure, the number of accessed KV data is two.

In this example, with respect to both the flat structure and the cluster structure, the number of times of access to KV data is two. However, in the case of the cluster structure, one KV data contains a plurality of record data, and therefore, unnecessary data for query processing is also accessed. In the exemplified case, the number of products whose product category is "personal computer" is only two. However, in a case where the number of products whose product category is "personal computer" is 1000, one KV data contains 1000 record data. In this case, therefore, in order to search for data in which the product name is "A," all the 1000 record data are acquired for acquisition of one data. As a result, unnecessary data flows on the network and query response performance deteriorates. Accordingly, it can be said that the flat structure, in which unnecessary data is not acquired, is appropriate for search or update processing with a key having low multiplicity such as a primary key or a unique key.

Thus, the flat structure and the cluster structure have merits, respectively. Therefore, by converting the data structure of the KVS 1 between the flat structure and the cluster structure depending on the use condition (statistical information or the like), it is possible to convert into a more appropriate data structure for the use condition.

Further, the KVS 1 that executes the data structure conversion processing between the flat structure and the cluster structure has been described in this exemplary embodiment. However, the data structure conversion processing executed by the KVS 1 is not limited to the processing between the two structures mentioned above. The KVS 1 can be configured to execute the data structure conversion processing between data structures other than the flat structure and the cluster structure.

An example of data structures other than the abovementioned structures is the nest structure. The nest structure is a structure in which data of a plurality of tables are combined. In other words, in the nest structure, a value corresponding one key contains record data of a plurality of tables. In KV data with this structure, it is possible to simultaneously change records of a plurality of tables in one transaction processing. Therefore, in a case where it is expected to simultaneously change records of a plurality of tables as mentioned above, the nest structure is advantageous. On the other hand, in the nest structure, even if it is desired to access only one record of one table, it is necessary to acquire high-volume data. The KVS 1 can be configured to execute the data structure conversion processing between the nest structure and another structure.

Further, the KVS 1 may be configured to execute the data structure conversion processing between two data structures, or may be configured to execute the data structure conversion processing among three or more data structures. Furthermore, the KVS 1 may be configured to execute the data structure conversion processing between data structures other than illustrated above.

Second Exemplary Embodiment

Next, a second exemplary embodiment of the present invention will be described in detail referring to the attached drawings. In the second exemplary embodiment, a KVS 2 which can detect the load on an information processing device operated by the system and execute the data structure conversion processing when the load of machine resources is low will be described. The KVS 2 in this exemplary embodiment has partly the same configuration as the KVS 1 described in the first exemplary embodiment. Therefore, in this exemplary embodiment, a description will be made focusing on a different part from the first exemplary embodiment.

Referring to FIG. 10, the KVS 2 in this exemplary embodiment has the query processing unit 11, the statistical information collecting unit 12, the data structure converting unit 13, the KV data deleting unit 14, the KV data storing unit 15, the difference data storing unit 16, the converted data storing unit 17, the statistical information storing unit 18, the system catalog 19, and a resource load monitoring unit 21. The same components as the components described in the first exemplary embodiment are denoted by the same reference numerals. The KVS 2 in this exemplary embodiment is different from the KVS 1 in the first exemplary embodiment in that it has the resource load monitoring unit 21.

The resource load monitoring unit 21 has a function of regularly monitoring the resources (CPU utilization, disk JO (Input/Output) amount, and so on) of an information processing device in which the data structure converting unit 13 operates. When the resource utilization of the information processing device in which the data structure converting unit 13 operates is low, the resource load monitoring unit 21 instructs the data structure converting unit 13 to start the data structure conversion processing. The data structure converting unit 13 in this exemplary embodiment, in response to the instruction by the resource load monitoring unit 21, determines whether or not to start the data structure conversion processing, and starts the data structure conversion processing. In other words, upon acceptance of the instruction by the resource load monitoring unit 21, the data structure converting unit 13 in this exemplary embodiment refers to the system catalog information and the statistical information, determines whether or not there is a table to be subjected to structure conversion, and starts the data structure conversion processing.

In a case where the amount of data to be converted is large, the data structure conversion processing may be heavily loaded processing. Processing of a query from a client can be executed during the data structure conversion processing. However, in a case where many machine resources are spent for the data structure conversion processing, it is anticipated the performance of the processing of the query from the client deteriorates. Therefore, by executing the data structure conversion processing when the load of machine resources is low as in this exemplary embodiment, it is possible to effectively utilize the resources of the information processing device in which the data structure converting unit 13 operates. Moreover, by configuring as in this exemplary embodiment, it is possible to inhibit deterioration of the performance of query processing executed by a client.

Thus, the KVS 2 in this exemplary embodiment has the resource load monitoring unit 21. This configuration enables the KVS 2 to execute the data structure conversion processing when the load of machine resources monitored by the resource load monitoring unit 21 is low. As a result, the KVS 2 can effectively utilize the resources of the information processing device. Moreover, the KVS 2 can execute the data structure conversion processing while inhibiting deterioration of the performance of query processing executed by a client.

Third Exemplary Embodiment

Next, a third exemplary embodiment of the present invention will be described in detail referring to the attached drawings. In the third exemplary embodiment, a KVS 3 configured to be capable of regularly deleting statistical information stored by the statistical information storing unit 18 will be described. The KVS 3 in this exemplary embodiment includes partly the same configuration as the KVS 1 and the KVS 2. Therefore, in this exemplary embodiment, a description will be made focusing on a different part from the KVS 2 and the KVS 3.

Referring to FIG. 11, the KVS 3 in this exemplary embodiment has the query processing unit 11, the statistical information collecting unit 12, the data structure converting unit 13, the KV data deleting unit 14, the KV data storing unit 15, the difference data storing unit 16, the converted data storing unit 17, the statistical information storing unit 18, the system catalog 19, and a statistical information managing unit 31. The KVS 3 in this exemplary embodiment is different from the KVS 1 and the KVS 2 in that it has the statistical information managing unit 31.

The statistical information managing unit 31 has a function of regularly deleting statistical information stored by the statistical information storing unit 18. To be specific, the statistical information managing unit 31 is configured to delete older statistical information than a predetermined time. For example, the statistical information managing unit 31 refers to a clock part, which is not shown in the drawings, and determines whether or not a given time has passed from access time stored in the statistical information. Then, in the case of determining the given time has passed from the access time stored in the statistical information, the statistical information managing unit 31 deletes the statistical information with the given time passed, from the statistical information storing unit 18. Consequently, from the statistical information storing unit 18, older statistical information than a predetermined time is deleted. The predetermined time can be previously set in the statistical information managing unit 31 by the user. Moreover, the statistical information managing unit 31 may be configured so that the predetermined time can be changed while the system is operating (while the KVS 3 is operating).

Thus, the KVS 3 in this exemplary embodiment has the statistical information managing unit 31. This configuration enables the KVS 3 to regularly delete old statistical information stored by the statistical information storing unit 18. In general, it is expected that, in the case of determining whether or not to change the data structure of KV data, the accuracy is likely to be higher when the determination is performed based on statistical information closer to the current time (time to execute the data structure conversion processing) than when the determination is performed based on the past statistical information. Therefore, by thus regularly deleting old statistical information, it is possible to more accurately perform determination whether or not to convert the data structure.

Meanwhile, the configuration of the KVS 3 is not limited to the abovementioned example. The KVS 3 may include, for example, the resource load monitoring unit 21.

Fourth Exemplary Embodiment

Next, a fourth exemplary embodiment of the present invention will be described in detail referring to the attached drawings. In the fourth exemplary embodiment, a KVS 4 which creates a structure conversion plan based on an access pattern or the like and executes the data structure conversion processing based on the created structure conversion plan will be described. The trend of queries to a database system may have a fixed pattern to some extent depending on date and period of time (for example, the database system is intensively accessed with a specific key on weekends). Then, by creating a structure conversion plan according to a specific pattern in advance and executing the data structure conversion processing based on the plan, it is possible to execute more effective structure conversion. The KVS 4 in this exemplary embodiment includes partly the same configuration as the KVS 1, the KVS 2 and the KVS 3 described above. Therefore, in this exemplary embodiment, a description will be made focusing on a different part from the KVS 1, the KVS 2 and the KVS 3.

Figure 12:
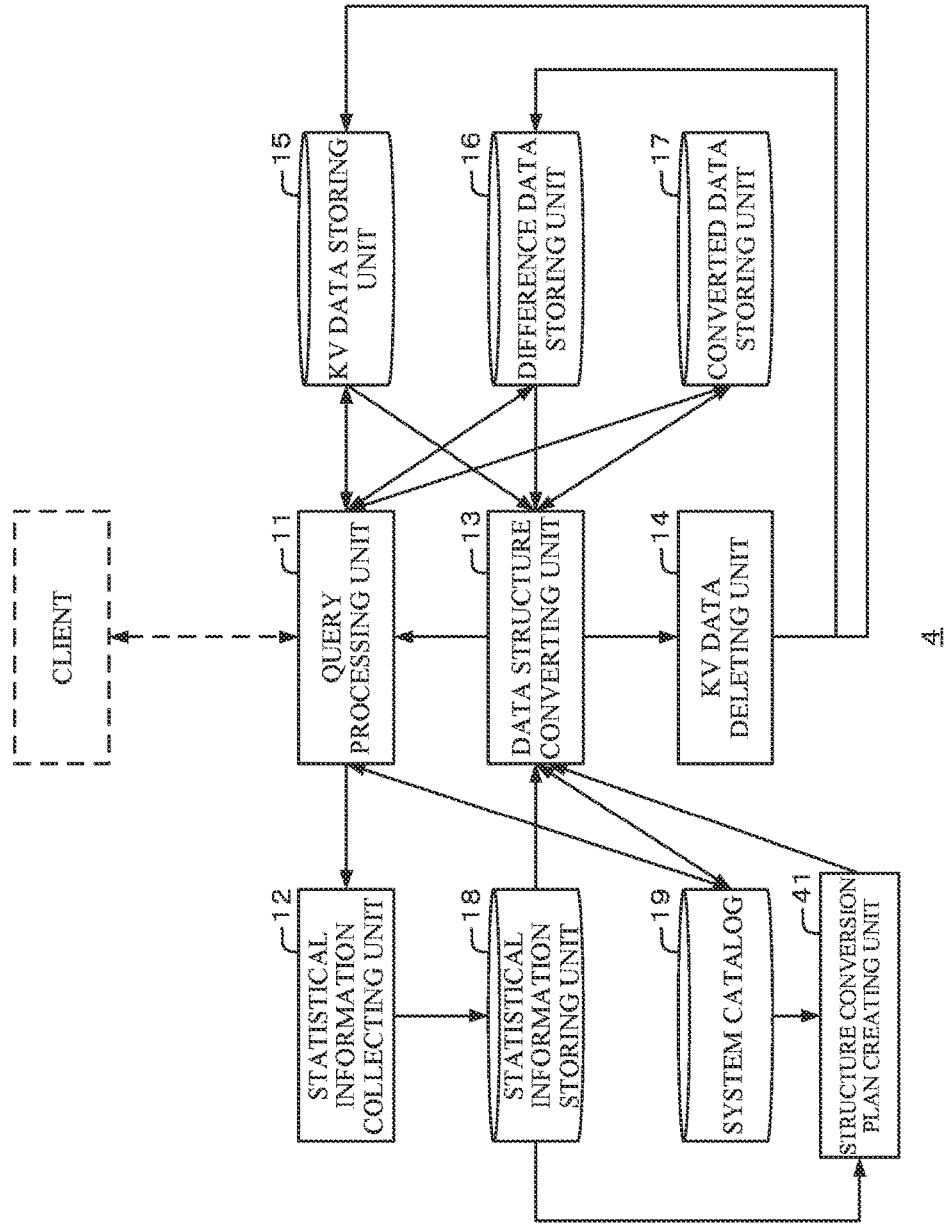
FIG. 12 is a block diagram showing the configuration of a KV store according to a fourth exemplary embodiment of the present invention.

Referring to FIG. 12, the KVS 4 in this exemplary embodiment has the query processing unit 11, the statistical information collecting unit 12, the data structure converting unit 13, the KV data deleting unit 14, the KV data storing unit 15, the difference data storing unit 16, the converted data storing unit 17, the statistical information storing unit 18, the system catalog 19 (a conversion history information storing unit), and a structure conversion plan creating unit 41 (a data structure conversion plan creating unit). The KVS 4 in this exemplary embodiment is different from the KVS 1, the KVS 2 and the KVS 3 in that it has the structure conversion plan creating unit 41. Moreover, the system catalog 19 in this exemplary embodiment is configured to store a conversion history since the start of system operation.

As mentioned above, the system catalog 19 in this exemplary embodiment stores a conversion history since the start of system operation as system catalog information. To be specific, the system catalog 19 stores system catalog information as shown below, for example (see FIG. 13). The system catalog information shown below is an example of system catalog information stored by the system catalog 19. (Table, KV structure, KV structure conversion time)
(table A, FLAT, 2013/11/28 10:00)
(table B, CLUSTER, 2013/11/28 10:00)
(table C, CLUSTER, 2013/11/28 10:00)
(table A, CLUSTER, 2013/11/28 12:00)
(table C, FLAT, 2013/11/28 12:00)

For example, in the example shown in FIG. 13, it is found the data structure of the table A is the flat structure from 2013/11/28 10:00 until 2013/11/28 12:00 and is the cluster structure since 2013/11/28 12:00. Thus, the system catalog information in this exemplary embodiment is configured in a manner that a data structure conversion history can be referred to.

The structure conversion plan creating unit 41 has a function of creating a structure conversion plan, which is a plan for performing structure conversion. The structure conversion plan creating unit 41 acquires statistical information from the statistical information storing unit 18. The structure conversion plan creating unit 41 also acquires system catalog information from the system catalog 19. Then, the structure conversion plan creating unit 41 creates a structure conversion plan based on the acquired statistical information and system catalog information.

Patterns for creating a plan include, for example, period of time, day of week, date, and month. The structure conversion plan creating unit 41 analyzes access patterns for period of time, day of week, date and month from the statistical information and the system catalog information. Then, the structure conversion plan creating unit 41 creates a structure conversion plan based on the analyzed access patterns. A structure conversion plan is, for example, "convert and keep the table A in the cluster structure with the product category column as a cluster key during a period from 12:00 on Saturday to 12:00 on Sunday" or "convert and keep the table B in the flat structure during a period from 15:00 on the last day of a month to 15:00 on the first day of the next month." Thus, a structure conversion plan defines time and date to convert, a data structure to be converted, a cluster key at the time of conversion into the cluster structure, and so on.

Further, the structure conversion plan creating unit 41 includes a structure conversion plan storing unit, which is not shown in the drawings. The structure conversion plan created by the structure conversion plan creating unit 41 is stored into the structure conversion plan storing unit. Moreover, the structure conversion plan creating unit 41 instructs the data structure converting unit 13 to start the data structure conversion processing in accordance with the structure conversion plan stored in the structure conversion plan storing unit. The data structure converting unit 13 then starts the data structure conversion processing in response to the instruction by the structure conversion plan creating unit 41. Consequently, it is possible to perform more effective structure conversion according to the plan.

Hereinafter, the operation of the structure conversion plan creating unit 41 in creation of a structure conversion plan (the operation in structure conversion plan update processing) will be described.

Figure 14:
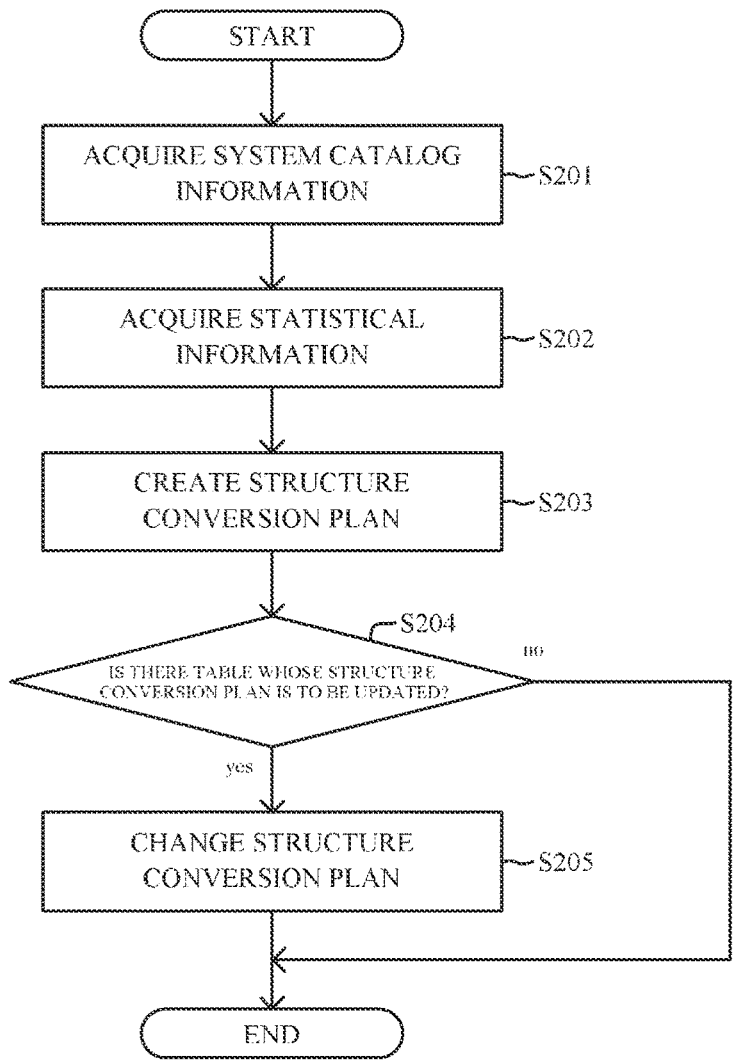
FIG. 14 is a flowchart showing operation in creation of a structure conversion plan in the fourth exemplary embodiment of the present invention.

Referring to FIG. 14, the structure conversion plan creating unit 41 acquires system catalog information from the system catalog 19 (S201). Further, the structure conversion plan creating unit 41 acquires statistical information from the statistical information storing unit 18 (S202).

Next, the structure conversion plan creating unit 41 creates a structure conversion plan based on the acquired system catalog information and statistical information (S203). The structure conversion plan creating unit 41 analyzes access patterns for period of time, day of week, date and month from the statistical information and the system catalog information, for example. Then, the structure conversion plan creating unit 41 creates a structure conversion plan based on the analyzed access patterns.

Subsequently, the structure conversion plan creating unit 41 compares the created structure conversion plan with a past structure conversion plan stored in the structure conversion plan storing unit. In a case where there is a table whose structure conversion plan is to be updated (S204, yes), the structure conversion plan creating unit 41 updates the structure conversion plan stored in the structure conversion plan storing unit to the created structure conversion plan (S205). In the case of first creation of a structure conversion plan, the structure conversion plan creating unit 41 stores the created structure conversion plan into the structure conversion plan storing unit. On the other hand, in a case where there is not a table whose structure conversion plan is to be updated, the structure conversion plan creating unit 41 discards the created structure conversion plan, for example. By such operation, the structure conversion plan stored in the structure conversion plan storing unit is brought up to date.

Then, the structure conversion plan creating unit 41 instructs the data structure converting unit 13 to start the data structure conversion processing in accordance with the structure conversion plan stored in the structure conversion plan storing unit. The data structure converting unit 13 starts the data structure conversion processing in response to the instruction by the structure conversion plan creating unit 41.

The structure conversion plan update processing by the structure conversion plan creating unit 41 may have any configuration as far as configured to be regularly executed. Therefore, the timing of execution of the structure conversion plan update processing by the structure conversion plan creating unit 41 is not particularly limited.

Thus, the KVS 4 in this exemplary embodiment has the structure conversion plan creating unit 41. This configuration enables the KVS 4 to execute the data structure conversion processing in accordance with a structure conversion plan created by the structure conversion plan creating unit 41. In general, the trend of queries to a database system may have a fixed pattern to some extent depending on date and period of time. Therefore, by previously creating a structure conversion plan according to the abovementioned patterns and executing the data structure conversion processing in accordance with the structure conversion plan, more effective data structure conversion can be performed.

Fifth Exemplary Embodiment

Next, a fifth exemplary embodiment of the present invention will be described referring to the attached drawings. In this exemplary embodiment, an information storage system configured to be able to convert the data structure of key value data will be described. In this exemplary embodiment, the overview of the configuration of the information storage system will be described.

Figure 15:
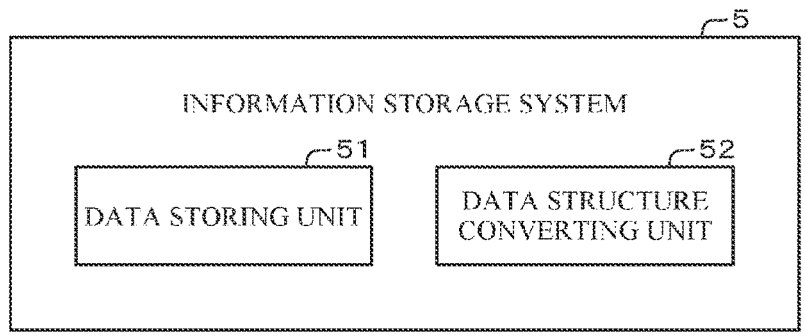
FIG. 15 is a schematic block diagram showing the overview of the configuration of an information storage system according to a fifth exemplary embodiment of the present invention.

Referring to FIG. 15, an information storage system 5 has a data storing unit 51 and a data structure converting unit 52.

The data storing unit 51 is a storage device such as a hard disk or a memory. The data storing unit 51 uses any of a plurality of kinds of data structures determined in advance, and stores key value data in which a value composed of record data to be stored is associated with a key which is information for identifying the value.

The data structure converting unit 52 has a function of converting the data structure of the key value data stored by the data storing unit 51 between the plurality of data structures determined in advance. The data structure converting unit 52 performs conversion of the data structure of the key value data stored by the data storing unit 51 depending on the use condition of the key value data.

Thus, the information storage system 5 in this exemplary embodiment has the data storing unit 51 and the data structure converting unit 52. Further, the data structure converting unit 52 is configured to convert the data structure of the key value data stored by the data storing unit 51 depending on the use condition of the key value data. This configuration enables the information storage system 5 to, for example, in a case where the use condition of the key value data has changed, perform conversion of the data structure of the key value data in accordance with change of the use condition of the key value data. As a result, the information storage system 5 can keep its performance even if the use condition has changed.

Further, the information storage system 5 described above can be realized by installation of a given program into an information processing device. To be specific, a program as another aspect of the present invention is a computer program including instructions for causing an information processing device to realize: a data storing unit for, by using any of a plurality of kinds of data structures determined in advance, storing key value data in which a value composed of record data to be stored is associated with a key which is information for identifying the value; and a data structure converting unit for converting a data structure of the key value data stored by the data storing unit between the plurality of kinds of data structures determined in advance, wherein the data structure converting unit performs conversion of the data structure of the key value data stored by the data storing unit in accordance with a use condition of the key value data.

Further, an information storage method executed by operation of the information storage system 5 described above includes: acquiring a use condition of key value data stored by a data storing unit; and converting a data structure of the key value data stored by the data storing unit between a plurality of kinds of data structures determined in advance based on the acquired use condition.

The invention of the program and the information storage method having the abovementioned configurations also has the same action as the information storage system described above, and therefore, can achieve the object of the present invention mentioned above.

<Supplementary Notes>

The whole or part of the exemplary embodiments disclosed above can be described as the following supplementary notes. The overview of an information storage system and so on according to the present invention will be described below. However, the present invention is not limited to the following configurations.

(Supplementary Note 1)

An information storage system including:

a data storing unit storing key value data in which a key is one of a plurality of elements of record data composed of the elements and the key is associated with a value including one or a plurality of record data; and a data structure converting unit converting a data structure of the key value data stored by the data storing unit into another data structure by changing the key, wherein the data structure converting unit performs conversion of the data structure of the key value data stored by the data storing unit in accordance with a use condition of the key value data.

According to this configuration, the information storage system has the data storing unit and the data structure converting unit. Moreover, the data structure converting unit is configured to convert the data structure of the key value data stored by the data storing unit in accordance with the use condition of the key value data. This configuration enables the information storage system to, for example, in a case where the use condition of the key value data has changed, convert the data structure of the key value data in accordance with change of the use condition of the key value data.

(Supplementary Note 2)

The information storage system according to Supplementary Note 1, including:

a search processing unit performing search of the key value data stored by the data storing unit and executing given processing; and a statistical information collecting unit collecting and storing statistical information based on a result of the search by the search processing unit, wherein the data structure converting unit converts the data structure of the key value data in accordance with the user condition indicated by the statistical information.

According to this configuration, the information storage system has the search processing unit and the statistical information collecting unit. Moreover, the data structure converting unit is configured to convert the data structure of the key value data based on the statistical information collected by the statistical information collecting unit. This configuration enables the information storage system to convert the data structure based on the statistical information which changes in accordance with the search result. As a result, the information storage system can keep its performance with more stability.

(Supplementary Note 3)

The information storage system according to Supplementary Note 2, wherein:

the statistical information collecting unit is configured to collect as the statistical information, a number of the key value data having been subjected to the search by the search processing unit, a number of the record data to be subjected to the given processing of the key value data, and a number of the record data not to be subjected to the given processing; and the data structure converting unit converts the data structure of the key value data in accordance with the use condition indicated by the number of the key value data, the number of the record data to be subjected to the given processing of the key value data, and the number of the record data not to be subjected to the given processing, the numbers having been collected by the statistical information collecting unit.

(Supplementary Note 4)

The information storage system according to Supplementary Note 2 or 3, wherein:

the search processing unit is configured to, as the given processing, update the record data contained in the key value data having been subjected to the search, and in a case where the record data is updated while the data structure converting unit performs the conversion of the data structure, the search processing unit stores the key value data containing the updated record data into a different place from key value data on which the conversion is performed; and after the conversion of the data structure of the key value data stored by the data storing unit, the data structure converting unit converts the data structure of the key value data stored in the different place.

According to this configuration, the search processing unit of the information storage system is configured to update the record data contained in the searched key value data, and in a case where the record data is updated while the data structure converting unit performs the conversion of the data structure, the search processing unit stores the key value data containing the updated record data into a different place from key value data on which the conversion is performed. Moreover, after the conversion of the data structure of the key value data stored by the data storing unit, the data structure converting unit converts the data structure of the key value data stored in the different place. This configuration enables the information storage system to, even when the update of the record data is performed during the conversion of the data structure, update the record data without influencing the conversion of the data structure. Further, this configuration makes it possible to reflect the record data updated during the conversion of the data structure on the conversion of the data structure. As a result, the information storage system can convert the data structure without stopping a query from a client.

(Supplementary Note 5)

The information storage system according to any of Supplementary Notes 2 to 4, wherein the statistical information collecting unit is configured to delete the statistical information which is older than a predetermined time.

According to this configuration, the statistical information collecting unit is configured to delete the statistical information which is older than a predetermined time. With this configuration, old statistical information is deleted. In general, it is possible to more accurately determine whether or not to change the data structure when determining based on newer statistical information. Therefore, this configuration makes it possible to more accurately determine whether or not to convert the data structure.

(Supplementary Note 6)

The information storage system according to any of Supplementary Notes 2 to 5, including:

a conversion history information storing unit storing conversion history information indicating a history of the conversion of the data structure by the data structure converting unit; and a data structure conversion plan creating unit creating a plan of date and time to convert the data structure of the key value data based on the statistical information acquired from the statistical information collecting unit and the conversion history information acquired from the conversion history information storing unit, wherein the data structure converting unit performs the conversion of the data structure based on the plan created by the data structure conversion plan creating unit.

According to this configuration, the information storage system includes the data structure conversion plan creating unit. Moreover, the data structure converting unit converts the data structure based on the plan of the data structure conversion plan creating unit. This configuration makes it possible to perform the conversion of the data structure according to a certain pattern such as the trend of queries. As a result, it is possible to more effectively convert the data structure.

(Supplementary Note 7)

The information storage system according to any of Supplementary Notes 1 to 6, including a resource load monitoring unit monitoring a resource of an information processing device having the data structure converting unit, wherein:

the resource load monitoring unit gives the data structure converting unit an instruction to perform the conversion of the data structure based on the monitored resource; and the data structure converting unit performs the conversion of the data structure based on the instruction by the resource load monitoring unit.

According to this configuration, the information storage system includes the resource load monitoring unit. Moreover, the data structure converting unit converts the data structure based on the instruction by the resource load monitoring unit. This configuration enables the information storage system to perform the conversion of the data structure when the load on the information processing device is low. As a result, it is possible to execute data structure conversion processing while inhibiting deterioration of the performance of query processing executed by the user.

(Supplementary Note 8)

The information storage system according to any of Supplementary Notes 1 to 7, wherein:

the data storing unit is configured to store the key value data by using either a first data structure or a second data structure, the first data structure in which the key is the element as identification information that is unique to each record data among the plurality of elements, the second data structure in which the key is the element that is contained in a plurality of record data and that is different from the key of the first data structure; and the data structure converting unit converts the data structure of the key value data stored by the data storing unit between the first data structure and the second data structure.

(Supplementary Note 8-1)

The information storage system according to Supplementary Note 8, including:

a search processing unit performing search of the key value data stored by the data storing unit and executing given processing; and a statistical information collecting unit collecting and storing statistical information based on a result of the search by the search processing unit, wherein the statistical information collecting unit acquires, as the statistical information, a number of the key value data searched by the search processing unit; and wherein the data structure converting unit converts the data structure of the key value data from the first data structure into the second data structure based on the number of the key value data, the number having been collected by the statistical information collecting unit.

(Supplementary Note 8-2)

The information storage system according to Supplementary Note 8-1, wherein the data structure converting unit compares the number of the key value data collected by the statistical information collecting unit with a predetermined first data conversion threshold, and in a case where the number of the key value data is equal to or more than the first data conversion threshold, the data structure converting unit converts the data structure from the first data structure into the second data structure.

(Supplementary Note 8-3)

The information storage system according to any of Supplementary Notes 8 to 8-2, including:

a search processing unit performing search of the key value data stored by the data storing unit and executing given processing; and a statistical information collecting unit collecting and storing statistical information based on a result of the search by the search processing unit, wherein the statistical information collecting unit acquires, as the statistical information, a number of the record data to be subjected to the given processing of the key value data searched by the search processing unit, and a number of the record data not to be subjected to the given processing; and wherein the data structure converting unit converts the data structure from the second data structure into the first data structure based on the number of the record data to be subjected to the given processing and the number of the record data not to be subjected to the given processing, the numbers having been collected by the statistical information collecting unit.

(Supplementary Note 8-4)

The information storage system according to Supplementary Note 8-3, wherein the data structure converting unit compares a ratio with a predetermined second data conversion threshold, and in a case where the ratio is equal to or more than the second data conversion threshold, the data structure converting unit converts the data structure from the second data structure into the first data structure, the ratio being a ratio of the number of the record data to be subjected to the given processing and the number of the record data not to be subjected to the given processing.

(Supplementary Note 9)

An information storage method including:

acquiring a use condition of key value data stored by a data storing unit; and converting a data structure of the key value data stored by the data storing unit into another data structure by changing a key of the key value data based on the acquired use condition.

(Supplementary Note 10)

A non-transitory computer-readable medium storing a program including instructions for causing an information processing device to realize:

a data storing unit storing key value data in which a key is one of a plurality of elements of record data composed of the elements and the key is associated with a value including one or a plurality of record data; and a data structure converting unit converting a data structure of the key value data stored by the data storing unit into another data structure by changing the key, wherein the data structure converting unit performs conversion of the data structure of the key value data stored by the data storing unit in accordance with a use condition of the key value data.

The program disclosed in the exemplary embodiments and supplementary notes is stored in a storage device or recorded on a computer-readable recording medium. For example, the recording medium is a portable medium such as a flexible disk, an optical disk, a magneto-optical disk or a semiconductor memory.

Although the present invention has been described above referring to the exemplary embodiments, the present invention is not limited to the exemplary embodiments. The configurations and details of the present invention can be changed and modified in various manners that can be understood by one skilled in the art within the scope of the present invention.

The invention claimed is:

1. An information storage system comprising:
   a storage device configured to store key value data, wherein a key is one of a plurality of elements of record data composed of the elements, and the key is associated with a value including one or a plurality of record data; and
   a central processing unit (CPU) configured to convert a data structure of the key value data into another data structure by changing the key, wherein the conversion is performed in accordance with a use condition of the key value data,
   wherein the storage device is further configured to store the key value data by using either a first data structure or a second data structure, wherein for the first data structure, a first key is identification information that is unique to each record data, and the first data structure is a structure of key value data in which one key value data corresponds to one record data, and wherein for the second data structure, a second key is utilized that is different from the first key, and the second data structure is a structure of key value data in which one key value data corresponds to one or multiple record data;
   wherein the CPU is configured to convert the data structure of the key value data between the first data structure and the second data structure,
   perform a search of the key value data stored by the storage device, execute given processing of the key value data, and
   collect and store statistical information based on a result of the search,
   wherein the CPU is further configured to convert the data structure of the key value data in accordance with a user condition indicated by the statistical information, and wherein,
   the CPU is configured to, as the given processing, update the record data contained in the key value data having been subjected to the search, and in a case where the record data is updated while the CPU performs the conversion of the data structure, the CPU is configured to store the key value data containing the updated record data into a different place from key value data on which the conversion is performed; and
   after the conversion of the data structure of the key value data stored by the storage device, the CPU is configured to convert the data structure of the key value data stored in the different place.

2. The information storage system according to claim 1, wherein the CPU is configured to delete the statistical information which is older than a predetermined time.

3. The information storage system according to claim 1,
   wherein the CPU is configured to store conversion history information indicating a history of the conversion of the data structure by the CPU; and
   create a plan of date and time to convert the data structure of the key value data based on the acquired statistical information and the acquired conversion history information,
   wherein the CPU is configured to perform the conversion of the data structure based on the created plan.

4. The information storage system according to claim 1, wherein the CPU is configured to monitor a resource of an information processing device, wherein:
   the CPU is configured to give the information processing device an instruction to perform the conversion of the data structure based on the monitored resource; and
   the information processing device is configured to perform the conversion of the data structure based on the instruction by the CPU.

5. An information storage method comprising:
   acquiring a use condition of key value data;
   converting a data structure of the key value data into another data structure by changing a key of the key value data based on the acquired use condition,
   storing the key value data by using either a first data structure or a second data structure, wherein for the first data structure, a first key is identification information that is unique to record data, and the first data structure is a structure of key value data in which one key value data corresponds to one record data, and wherein for the second data structure, a second key is utilized that is different from the first key, and the second data structure is a structure of key value data in which one key value data corresponds to one or multiple record data;
   converting the data structure of the key value data between the first data structure and the second data structure,
   performing a search of the stored key value data and executing given processing of the key value data;
   collecting and storing statistical information based on a result of the search;
   converting the data structure of the key value data in accordance with a user condition indicated by the statistical information;
   as the given processing, updating the record data contained in the key value data having been subjected to the search, and in a case where the record data is updated while conversion of the data structure occurs, storing the key value data containing the updated record data into a different place from key value data on which the conversion is performed; and
   after the conversion of the data structure of the key value data in accordance with a user condition indicated by the statistical information, converting the data structure of the key value data stored in the different place.

6. A non-transitory computer-readable medium storing a program comprising instructions for causing an information processing device to:
   store key value data, wherein a key is one of a plurality of elements of record data composed of the elements, and the key is associated with a value including one or a plurality of record data;
   convert a data structure of the key value data into another data structure by changing the key,
   wherein the conversion is performed in accordance with a use condition of the key value data;
   store the key value data by using either a first data structure or a second data structure, wherein for the first data structure, a first key is identification information that is unique to each record data, and the first data structure is a structure of key value data in which one key value data corresponds to one record data, and wherein for the second data structure, a second key is utilized that is different from the first key, and the second data structure is a structure of key value data in which one key value data corresponds to one or multiple record data;

convert the data structure of the key value data between the first data structure and the second data structure, perform a search of the stored key value data and execute given processing of the key value data;

collect and store statistical information based on a result of the search;

convert the data structure of the key value data in accordance with a user condition indicated by the statistical information;

as the given processing, updating the record data contained in the key value data having been subjected to the search, and in a case where the record data is updated while conversion of the data structure occurs, storing the key value data containing the updated record data into a different place from key value data on which the conversion is performed; and after the conversion of the data structure of the key value data in accordance with a user condition indicated by the statistical information, converting the data structure of the key value data stored in the different place.

7. The information storage system according to claim 1, wherein:

the CPU is further configured to collect as the statistical information, a number of the key value data having been subjected to the search, a number of the record data to be subjected to the given processing of the key value data, and a number of the record data not to be subjected to the given processing; and the CPU is further configured to convert the data structure of the key value data in accordance with the use condition indicated by the number of the key value data, the number of the record data to be subjected to the given processing of the key value data, and the number of the record data not to be subjected to the given processing, the numbers having been collected by the CPU.

* * * * *